March 1, 1949.   C. SAURER   2,463,059
RESILIENT MOUNTING FOR MOTORS AND THE LIKE
Filed Oct. 25, 1945

INVENTOR.
CURT SAURER
BY
Oberlin & Limbach
ATTORNEYS

Patented Mar. 1, 1949

2,463,059

UNITED STATES PATENT OFFICE 2,463,059

RESILIENT MOUNTING FOR MOTORS AND THE LIKE

Curt Saurer, Detroit, Mich., assignor to The Ohio Rubber Company, Willoughby, Ohio, a corporation of Ohio Application October 25, 1945, Serial No. 624,519

2 Claims. (Cl. 248—358)

The present improvements, relating as indicated to resilient mountings, have more particular regard to resilient supports such as are quite generally used in automotive vehicles and elsewhere in order to yieldingly support on the frame of the vehicle the internal combustion engine employed to drive the latter. However, it will be understood that the present improved mounting is not limited to any such particular field of use but may be employed generally to provide a yielding structure between two relatively movable members for the purpose of dampening vibration and preventing transmission of vibration from one member to the other.

One principal object of the present invention is to provide a support of the type in question that will serve satisfactorily over a large variation of load-carrying capacities, e. g. that will work equally well with an applied load of from 50 pounds to 650 pounds. In other words, the mounting is adaptable to support internal combustion engines through a considerable range of size and whether of 2- or 4-cycle types.

A further object is to provide a mounting which includes a rebound member as well as a load-carrying member, such members being independent of each other so that they can be made individually out of hard or soft compounds in order most effectively to accomplish the desired results. Still another object is to incorporate in the mounting means that provide directional stability whereby transverse movement of the engine or other supported member may be restricted and at the same time provide considerably more longitudinal stability than in the case of engine or motor supports of similar type heretofore devised.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 2:
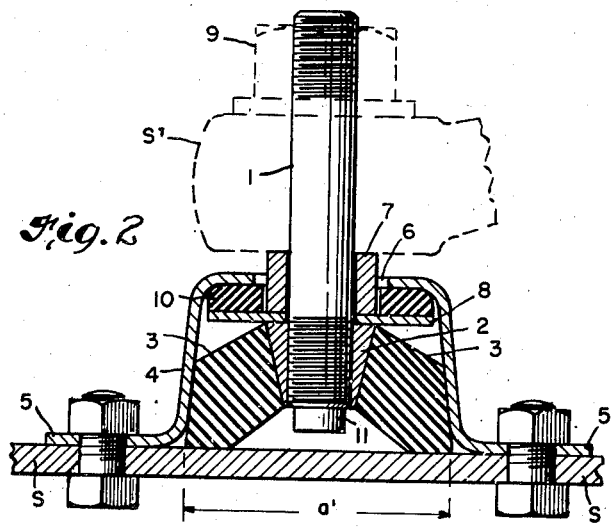
Fig. 2 is a longitudinal vertical section thereof taken on the plane indicated by the line 2—2 of Fig. 1.

Referring to Fig. 2, it will be noted that said figure illustrates my improved mounting in association with a supporting member S, which for the purpose of illustration may be part of the frame of an automotive vehicle, and a supported member S' which similarly may be an outwardly extending bracket or foot on an engine or motor.

Figure 4:
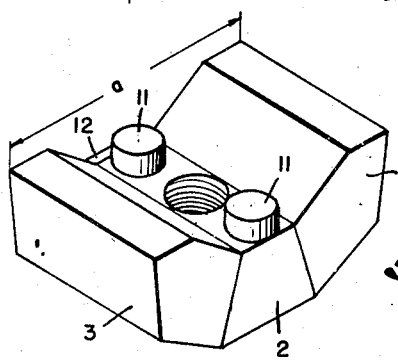
Fig. 4 is a perspective view of the principal resilient element comprised in the mounting.

The main load-carrying element of the mounting comprises a vertically disposed stud 1 to which the supported member is attached, as will be presently described. Fixedly attached to the lower end of said stud, as by being firmly threaded thereon, is a wedge-shaped element 2 to the opposite flaring faces of which are vulcanized two complementary pads 3 of rubber or equivalent material. The shape of such pads is best illustrated in Fig. 4 which shows the resilient load-carrying member in its original state prior to being assembled with the other parts of the mounting. From the figure just referred to, taken in conjunction with the showing in Fig. 2, it will be seen that each of these pads 3 has two substantially parallel faces that extend at approximately right angles to the corresponding face of wedge element 2, the faces in question joining two approximately rectangular related end faces of which the lowermost are designed to rest on supporting member S while the two which face outwardly are designed to be laterally confined by means of an enclosing housing 4, as will now be described.

Figure 1:
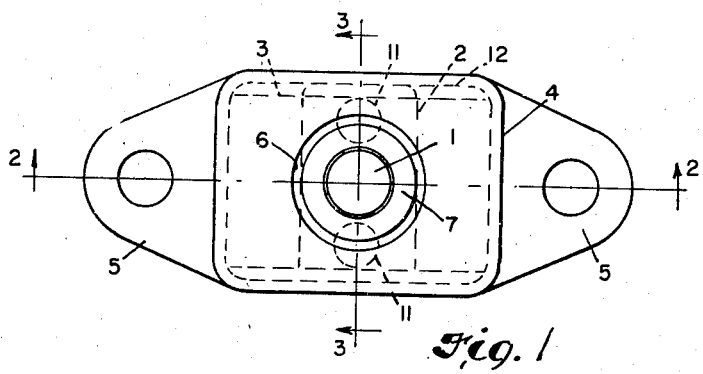
Fig. 1 is a top plan view of an assembled mounting embodying my present improvements.

Said housing (see Fig. 1) will preferably be made in the form of a hollow metal stamping having laterally extending webs 5 whereby it may be securely bolted or otherwise attached to supporting member S. The upper wall of the casing is formed with a circular opening 6 sufficiently large not only to accommodate the stud 1 but a collar 7 that surrounds the adjacent portion of the stud and rests on a plate 8 interposed between the latter and the upper face of wedge element 2. The supported member S', it will be noted, when secured to the stud 1 is held in place against said collar 7 by means of a nut 9 on the outer end of the stud.

As a result, any vertical movement of member S' will tend to impart a corresponding vertical movement to the wedge 2 which constitutes in effect the center or keystone of the arcuate load-carrying member composed of said wedge and the two resilient pads 3, 3.

Plate 8 upon which collar 6 rests is spaced from the upper wall of housing 4, and interposed between the plate and such wall is a resilient pad 10 of general rectangular form that constitutes a rebound member, i. e., a member that serves to cushion upward movement of the plate and thus of stud 1 and the member S' supported by the latter. This rebound pad, being entirely independent of the pads 3 comprised in the arcuate load-carrying member, may be made out of a material, e. g. rubber, having a different composition than that of such pads so as to be either harder or softer as desired to meet the actual conditions of use for which the mounting is designed.

Returning to the arcuate load-carrying member composed of the central wedge element 2 and the two resilient pads 3 that extend laterally and downwardly therefrom, it should be noted that the overall length (indicated by the line a) of said member in its normal disassembled condition, as illustrated in Fig. 4, is considerably greater than the corresponding internal dimension (see line a' on Fig. 2) of the housing 4 within which such load-supporting member is held under compression in the assembled condition of the mounting. As a result, any weight or downward impact applied through stud 1 to the load-supporting member is resisted by a straight compressive action on the two rubber pads 3, 3. At the same time by relatively varying the dimensions a and a', e. g. by increasing or decreasing the overall length of the load-supporting member without changing the dimensions of the housing 4, the initial as well as the ultimate amount of such compressive action in resistance to load or impact may be correspondingly varied through a wide range, for example, from 50 pounds to 650 pounds.

Figure 3:
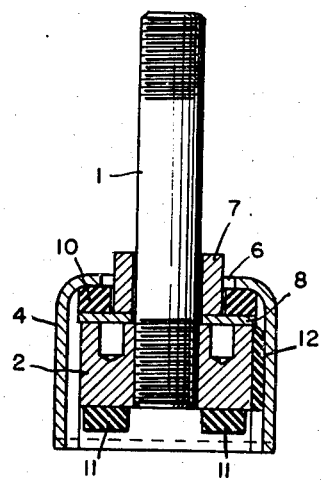
Fig. 3 is a transverse vertical section taken on the plane indicated by the line 3—3 of Fig. 1.

If desired, limit stops in the form of spaced buttonlike projections 11 may be attached to the under side of the wedge element 2 of the load-sustaining member, these being preferably composed of rubber vulcanized to said element and of such vertical dimension as to seat on the supporting member S when the mounting is subjected to the maximum compressive strain which it is designed to bear. Also, as best shown in Fig. 3, a friction pad 12 may, if desired, be similarly vulcanized to one end face of wedge element 2, such pad being of proper thickness to bear against the adjacent side wall of housing 4 and thus provide directional stability in the mounting transversely of the latter. In some cases it may be found desirable to provide such a pad on both sides of element 2.

From the foregoing description it will be seen that my present improved resilient mount not only has a wide capacity when it comes to the load which may be carried by the mounting, but is at the same time of exceedingly simple and compact form and construction, involving the use of comparatively few parts which are readily manufactured and assembled together. Furthermore, as explained above, the resistance to rebound can be varied independently of the compressive action under load and by means of the friction pad or pads directional stability can be readily built into the device.

In describing certain parts of the device as made of rubber, it will be understood that this term is intended to connote not only the product resulting from the vulcanization of natural rubber, but also neoprene and other synthetic rubbers or rubber substitutes which are now available.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a resilient mounting designed to be interposed between a supporting and a supported member, the combination of two resilient pads inclined downwardly in opposite directions and an interposed rigid wedge member bonded thereto to form an arcuate load-carrying member the ends of which are shaped to rest directly upon such supporting member, said wedge member being adapted to carry such supported member, and a housing enclosing and laterally confining the outer ends of said pads under a predetermined initial degree of compression.

2. In a resilient mounting designed to connect a supporting and a relatively movable supported member, the combination of a rigid wedge member and two resilient pads bonded thereto to form an arcuate load-carrying member with said wedge member as the key of such arch, the ends of such load-carrying member being adapted to rest on such supporting member and said wedge member being adapted to carry such supported member, and means laterally confining the outer ends of said pads.

CURT SAURER.

REFERENCES CITED

The following references are of record in the file of this patent:

UNITED STATES PATENTS

| Number | Name | Date |
| --- | --- | --- |
| 1,920,436 | Riker | Aug. 1, 1933 |
| 2,019,052 | Lord | Oct. 29, 1935 |
| 2,115,458 | Geyer | Apr. 26, 1938 |
| 2,138,176 | Keys | Nov. 29, 1938 |
| 2,162,714 | Hamblin | June 20, 1939 |
| 2,179,959 | Schroedter | Nov. 14, 1939 |
| 2,196,428 | Saurer | Apr. 9, 1940 |
| 2,365,421 | Lord | Dec. 19, 1944 |
| 2,367,826 | Kubaugh | Jan. 23, 1945 |
| 2,367,830 | Kubaugh | Jan. 23, 1945 |
| 2,383,645 | Hahn | Aug. 28, 1945 |
| 2,407,588 | Thiry | Sept. 10, 1946 |

FOREIGN PATENTS

| Number | Country | Date |
| --- | --- | --- |
| 521,520 | Great Britain | May 23, 1940 |